United States Patent Office 3,156,555
Patented Nov. 10, 1964

3,156,555
METHOD OF CONTROLLING RELATIVE STEM GROWTH
Nathan E. Tolbert, Okemos, Mich., assignor to Research Corporation, New York, N.Y., a corporation of New York
No Drawing. Filed Mar. 21, 1963, Ser. No. 266,786
4 Claims. (Cl. 71—2.7)

This invention relates to a method of treating plants.

A particular object of the invention is to provide a method of controlling plant growth whereby plants with shorter and thicker stems and overall growth are obtained.

The objects and advantages of the invention are provided by the method for controlling plant growth which comprises treating plants with a compound of the formula $$R-N(CH_3)_3 \cdot Y$$

wherein R is a lower alkyl group of 3 to 4 carbon atoms and Y is a nonphytotoxic anion which may be inorganic or organic. The nature of anion is non-specific as it equilibrates with all other anions in the plant or in the soil when the compound is used. Illustrative of the wide range of anions which may be used are chloride, bromide, sulfate, phosphate, nitrate, bicarbonate, hydroxide, formate, acetate, succinate and citrate. The chlorides are typical and convenient.

Compounds of the group wherein R is isopropyl, 2-methylpropyl or n-propyl are particularly effective and are preferred.

The active compounds of the invention are effective for controlling plant growth when they are applied to soil in which the plants are grown or applied to the leaves or above ground parts of plants by such means as sprays, pastes, or powders. Generally one treatment is effective on the total growth of the plant; however, repeated treatments increase the extent of the effect. The amount of chemical in a treatment is dependent upon the desired growth change. A soil drench with from $10^{-2}$ to $10^{-4}$ molar aqueous solutions produces excellent effects. The compounds are effective over a wide range of temperatures and light conditions suitable for plant growth. These compounds are particularly of value because they produce shorter growth, of plants with little apparent toxicity or reduction in weight of the plant. Further the treated plants are darker green in color and the leaves are thicker and turgid, all of which are valuable characteristics in the practice of growing plants.

Table I includes quantitative data on the effectiveness of the treatments of the invention in reducing stem length of thatcher wheat plants when the compounds in the form of chlorides in the concentrations noted are applied to the roots of plants growing in 4 inch clay pots containing a mixture of approximately equal parts of sand and loam soil at greenhouse temperatures of 56° F. ±2 at night and between 60 to 70° F. during the day. Ninety ml. of an aqueous solution of the growth regulator in the indicated concentrations was poured once on the soil of each pot seven days after planting the seed. Two weeks after treatment, the distance from the base of the first leaf blade to the base of the second leaf blade of each plant was measured and averaged for the data in the table.

*Table I*

| No. | Compound | Height as Percent of Control | | | |
|---|---|---|---|---|---|
| | | $10^{-2}$ M | $10^{-3}$ M | $10^{-4}$ M | $10^{-5}$ M |
| 1 | $(CH_3)_3N^+-CH(CH_3)_2$ | 26 | 32 | 40 | 62 |
| 2 | $(CH_3)_3N^+-CH(CH_3)(C_2H_5)$ | 29 | 61 | 71 | 84 |
| 3 | $(CH_3)_3N^+-CH_2-CH_2-CH_3$ | 37 | 45 | 70 | 90 |
| 4 | $(C_2H_5)_3N^+-CH_2-CH_2-CH_3$ | Inactive | | | |
| 5 | $(CH_3)_2N-CH_2-CH_2-CH_3$ | Inactive | | | |
| 6 | $(CH_3)_3N^+-CH_3$ | Inactive | | | |
| 7 | $(CH_3)_3N^+-CH_2-CH_3$ | 50 | 60 | Inactive | |
| 8 | $(CH_3)_3N^+-(CH_2)_3-CH_3$ | 73 | Inactive | Inactive | |
| 9 | $(CH_3)_3N^+-(CH_2)_4-CH_3$ | Inactive | Inactive | Inactive | |
| 10 | $(CH_3)_3N^+-(CH_2)_5-CH_3$ | Inactive | Inactive | Inactive | |
| 11 | $(CH_3)_3N^+-CH_2-CH(CH_3)_2$ | 57 | 65 | Inactive | |
| 12 | $(CH_3)_3N^+-CH_2-CH(CH_3)(C_2H_5)$ | 78 | Inactive | | |

Table II includes quantitative data on the effect of the treatments of the invention in reducing stem length of Table Queen squash plants. Treatments were similar to those described for Table I, except that the night temperature was 65° F. and the day temperatures varied between 70 to 80° F. The comparative data are based on measurement of the length of the first internode of the stems of the plants.

*Table II*

| No. | Compound | Height as Percent of Control | | | |
|---|---|---|---|---|---|
| | | $10^{-2}$ M | $10^{-3}$ M | $10^{-4}$ M | $10^{-5}$ M |
| 1 | $(CH_3)_3N^+-CH(CH_3)_2$ | 21 | 32 | 40 | 80 |
| 2 | $(CH_3)_3N^+-CH(CH_3)(C_2H_5)$ | 20 | 28 | 57 | 80 |
| 3 | $(CH_3)_3N^+-CH_2-CH_2-CH_3$ | 15 | 20 | 41 | Inactive |
| 4 | $(C_2H_5)_3N^+-CH_2-CH_2-CH_3$ | Trace | Inactive | | |
| 5 | $(CH_3)_2N-CH_2-CH_2-CH_3$ | Inactive | | | |
| 6 | $(CH_3)_3N^+-CH_3$ | 53 | Inactive | | |
| 7 | $(CH_3)_3N^+-CH_2-CH_3$ | 40 | 74 | Inactive | |
| 8 | $(CH_3)_3N^+-(CH_2)_3-CH_3$ | 20 | 25 | 47 | Inactive |
| 9 | $(CH_3)_3N^+-(CH_2)_4-CH_3$ | 21 | 61 | Inactive | |
| 10 | $(CH_3)_3N^+-(CH_2)_5-CH_3$ | 25 | 65 | Inactive | |
| 11 | $(CH_3)_3N^+-CH_2-CH(CH_3)_2$ | 29 | 40 | Inactive | |
| 12 | $(CH_3)_3N^+-CH_2-CH(CH_3)(C_2H_5)$ | 20 | 45 | Inactive | |

It will be seen from the data in the foregoing tables that the structure of the organic moiety of the compounds must respond to highly specific requirements in order to be active for the production of shorter plants than normal.

The molecule must contain a trimethylammonium cation. Any other type of alkyl ammonium cation is inactive. Thus the triethyl derivatives as illustrated by compound No. 4 of the table are inactive and the dimethylamine derivatives (compound No. 5) are also inactive.

Any other alkyl group at the fourth alkyl than those specified above is much less active or completely inactive for the promotion of short growth of plants. Thus shorter chain alkyl ammonium salts as represented by tetramethylammonium salts (No. 6) have no activity and ethyltrimethylammonium salts (No. 7) have one-tenth as much activity as the three preferred compounds. Longer chain alkyl ammonium salts such as (n-pentyl)trimethylammonium salts (No. 9) are much less active. If the alkyl chain is increased in size to greater than (n-hexyl)-trimethylammonium salts (No. 10), the compounds are entirely inactive for producing this growth alternation.

From the foregoing specification, it will be seen that the present invention fully accomplishes the aims and objects specifically set forth herein and as will be apparent to those skilled in the art, suitable variations or changes in the methods of treating plants may be made without departing from the inventive concepts as defined in the appended claims.

This application is a continuation-in-part of my application Serial No. 124,382, filed July 17, 1961, now abandoned.

I claim:
1. The method of controlling the relative stem growth of plants consisting of treating plants with a compound of the formula

$$R-N(CH_3)_3 \cdot Y$$

wherein R is selected from the group consisting of isopropyl; n-propyl and 2-methylpropyl and Y is a non-phytotoxic anion in an amount effective to reduce relative stem growth without causing phytotoxic effects.

2. The method defined in claim 1 wherein R is isopropyl and Y is chloride.

3. The method defined in claim 1 wherein R is n-propyl and Y is chloride.

4. The method defined in claim 1 wherein R is 2-methylpropyl and Y is chloride.

References Cited in the file of this patent
UNITED STATES PATENTS 2,751,713  Abramitis _____ June 26, 1956
2,970,048  Hamm et al. _____ Jan. 31, 1961

OTHER REFERENCES

Plant Regulators, National Academy of Sciences, Nation Research Council, publication 384, pages b, c, 1, 14 and 15, June 2, 1955, 71—2.3.